Figure 1:
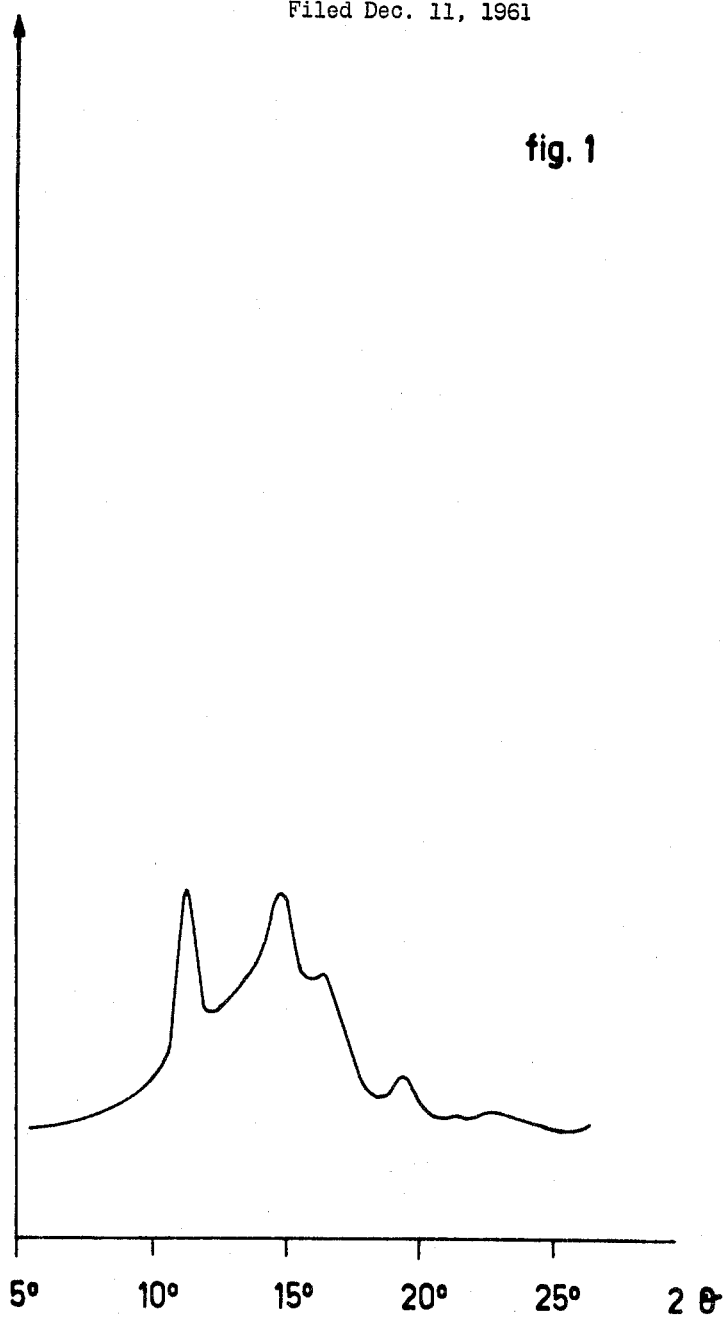

United States Patent Office 3,231,552
Patented Jan. 25, 1966

3,231,552
CRYSTALLINE HIGH POLYMERS OF ALPHA-METHYL-ACRYLONITRILE HAVING A STEREO-REGULAR STRUCTURE AND METHODS FOR PREPARING SAME
Giulio Natta, Giorgio Mazzanti, and Gino Dall'Asta, Milan, Italy, assignors to Montecatini Società Generale per l'Industria Mineraria e Chimica, Milan, Italy, a corporation of Italy
Filed Dec. 11, 1961, Ser. No. 158,343
Claims priority, application Italy, Dec. 14, 1960, 21,506/60
9 Claims. (Cl. 260—88.7)

The present invention relates to crystallizable high polymers of alpha-methyl acrylonitrile having a stereoregular structure. It further relates to high polymers of this monomer which are not crystallizable, but which differ from the other known polymers of the same monomer due to their particular properties. The present invention is also concerned with methods for preparing these polymers.

Polymers deriving from the monomer having the formula

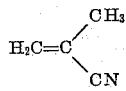

are known in the literature under the name of polymethacrylonitrile and various methods for their preparation have been described.

The catalysts most frequently described for this polymerization are of the free radical type. Methacrylonitrile in fact can be polymerized either in bulk or mass, in solutions of organic solvents or in aqueous emulsion using organic peroxides, organic hydroperoxides, inorganic peroxides, persulfates or other inorganic percompounds.

The possibility of polymerizing methacrylonitrile with catalysts of anionic type is also known. Among the catalysts which have been described may be mentioned metallic sodium (U.S. Patent No. 2,087,468), metallic sodium in liquid ammonia (U.S. Patent No. 2,608,555), triphenyl methyl sodium in ether solutions, alkyl magnesium halides in ether solutions, i.e., Grignard reactants (R. Beaman, J. Am. Chem. Soc. 70, 3115 (1958)), metallic lithium in liquid ammonia (C. G. Overberger et al., International High Polymer Conference, Nottingham, July 1958), and organophosphorous compounds such as triethyl phosphorous, diethyl phosphorous, monohydride and other like compounds (U.S. Patent No. 2,652,393).

All the known prior art methacrylonitrile polymers prepared by the free radical or by the anionic method, have chemical and physical properties resembling those described in a paper by Kern et al. (I. prakt. Chemie 160, 296 (1942)). They are soluble in various organic solvents, e.g., acetone, cyclohexane, benzonitrile and methylene chloride. They soften, depending on their molecular weight, at temperatures of from 100 to 130° C.; while at above 200° C. they decompose with the formation of monomer. Even at temperatures from 100° C., all the polymethacrylonitriles undergo some alteration and assume more or less intense colors varying from yellow to red. The thus modified polymer can be returned to the white state by a brief treatment with small amounts of acid, as has been observed by various authors.

All the polymethacrylonitriles known heretofore in the literature are amorphous as shown by X-ray examination. This amorphous form, their low softening point together with their high solubility indicates that they consist of sterically unordered macromolecules, i.e., atactic macromolecules.

It has now been found that, by operating in the presence of particular catalytic systems, it is possible to obtain high yields of new linear high polymers of alpha-methyl-acrylonitrile possessing physical and mechanical properties very different from those of the previously known polymers.

The attached graph shows the Geiger counter tracings or reflections of the X-ray diagram (CuαK) of the crystalline polymers of the present invention. The catalytic systems employed, according to the present invention, are organometallic compounds corresponding to the general formula:

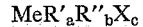

wherein Me is a metal belonging to groups Ia (i.e., Li, Na, K, Rb, Cs and Fr), II or III of the Periodic Table according to Mendeleeff; R' and R" are the same or different alkyl, cycloalkyl, aryl or alkyl-aryl groups containing 1 to 20 carbon atoms; X is a halogen; $a$ is zero or a number equal to or lower than 3; $b$ is a number between 1 and 3; $c$ is zero, 1 or 2; $c$ being zero when Me is a metal of group Ia; and $a+b+c$ represents the sum of valences of the metal.

Metals which are particularly suitable for the process of the present invention are: lithium, sodium, potassium, beryllium, magnesium, zinc, cadmium and aluminum.

Among the preferred catalysts which give the best results, there can be mentioned butyl lithium, diethyl beryllium, diethyl magnesium, diphenyl magnesium, dicyclohexyl magnesium, dibenzylmagnesium, monoethyl magnesium, monobromide, monophenyl magnesium monobromide, diethyl zinc, dibutyl zinc, monoethyl zinc monobromide and triethyl aluminum.

The preferred catalyst with respect to both good conversion of the monomer to polymer and desirable properties of the polymers obtained are, in general, the magnesium derivatives and, to a lesser extent, the beryllium and lithium derivatives.

The concentration of monomer with respect to the catalyst can be varied within wide limits. It is however advisable to use monomer/catalyst molar ratios between 10:1 and 200:1. Very good results, as far as the conversion of the monomer to polymer is concerned, can be obtained with ratios of 20:1 to 50:1.

The polymerization of alpha-methylacrylonitrile with aforedescribed catalysts can be carried out in mass (bulk) or in the absence of solvents. It is advisable, however, to operate in the presence of an inert solvent or diluent in order to avoid any possible overheating and also to reduce the occlusion of catalyst in the polymeric mass formed during the reaction. Inert solvents or diluents which do not react and do not form complexes with the catalyst are preferably used. Thus, aliphatic, cycloaliphatic and aromatic hydrocarbons can be used as solvents and especially good results have been obtained by using aromatic hydrocarbons such as toluene, benzene and the like.

On the other hand, compounds containing oxygen or nitrogen atoms having isolated electronic pairs cannot be employed as the solvents or diluents. Solvents such as ethers or amines can associate with the metal contained in the catalyst, thus hindering the stereo-regulated polymerization of alpha-methylacrylonitrile.

This is a point of distinction between the process of the present invention and other anionic polymerizations of alpha-methylacrylonitrile known in the literature (see e.g., R. Beaman, ibidem) wherein either solutions of the monomer and of the organometallic magnesium compounds are used.

In the process of the present invention such complexing solvents cannot be present even in stoichiometrical amounts with respect of the catalyst, since the formation of a complex between the monomer and the catalyst is an essential condition for the stereo-specific course of the alpha-methylacrylonitrile polymerization of the present invention. The formation of these complexes is shown by the formation of an intense color as soon as the monomer is added to the catalytic system.

The stereospecificity of the process of the present invention is ascribed to the fact that the monomer contains a nitrogen atom having an isolated electronic pair in the nitrile group (—C≡N:) bound to the vinylidenic group. This nitrogen atom allows a particular association of the monomer with the catalyst during the polymerization.

Therefore, the monomer molecule always inserts itself in the growing polymer chain with the same presentation or positioning. The constant presentation coupled with a constant type of opening of the polymerizable double bond, are no doubt the causes of the stereospecificity of the process.

This stereoregulated polymerization of alpha-methylacrylonitrile can be carried out at temperatures between —30° C. and +120° C., preferably between 0° and 100° C.

The polymerization processes of the present invention take place with high product yields and, after a relatively short time, high conversion of monomers to polymer are obtained at the aforementioned temperatures.

It is therefore an object of the present invention to provide a process for obtaining poly-alpha-methylacrylonitrile polymers possessing a regularly ordered steric structure.

A further object of the present invention is to provide these linear head-to-tail high polymers, having a sterically ordered structure.

Other objects and advantages of the present invention will become apparent as the description proceeds.

The polymers of the present invention are substantially made up of macromolecules wherein the substituents of the polymer chain are present in certain ordered steric relationships.

Due to their regularity of structure, not heretofore observed in poly-alpha-methylacrylonitriles, the polymers of the present invention possess particular chemical and physical properties which are very different from those of the heretofore described conventional polymers obtained from the same monomers.

The polymers of alpha-methylacrylonitrile which are obtained according to the process of the present invention can be divided, based on the catalysts used, into two general classes of products:

(a) Polymers obtained with the aid of catalysts containing organometallic magnesium or beryllium compounds.

(b) Polymers obtained with the aid of catalysts containing organometallic compounds of the other metals of groups Ia, II or III.

The poly-alpha-methylacrylonitriles obtained according to (a) in the form of crude products are more or less colored powders (from yellow to red).

After a brief treatment at 0° to 65° C., preferably at room temperature with methanol containing about 5 to 10% of hydrochloric acid (using 1 to 20 parts by weight, preferably 2 to 5 parts, of methanol containing 0.1 to 2 parts, preferably 0.2 to 0.5 part of conc. hydrochloric acid, per 1 part of crude polymer), the catalyst residues are removed from these crude products and the polymer thus obtained is a white powder.

This poly-alpha-methylacrylonitrile gives, e.g., the following analytical results:

N found=20.3% (N calculated=20.88%)
Ashes=0.07%

Thermal treatments at temperatures above 120° C., conducted either on the dry polymers or in high boiling solvents, cause a progressive coloring of the polymer. This color can be eliminated by treatment with methanol and hydrochloric acid.

In addition, by mixing the polymers of the present invention with small amounts of special high boiling substances, e.g., with 2–5% by weight of alpha-bromobutyric acid, this coloring can be avoided or at least remarkably reduced. Other high boiling substances which may be mixed with the polymer to avoid or reduce coloring are for instance: 1,2,3-tribromo-propane, 2-bromo-ethylacetate.

The poly-alpha-methylacrylonitriles obtained according to (a) possess a high regularity of structure and are crystalline as demonstrated by X-ray examination.

By treating the crude polymerizate with solvents, which not only dissolve a small portion of amorphous polymer fraction, but also swell the fraction having high regularity of structure, the crystallization of the insoluble fraction of the polymer is facilitated. For instance, by treating the crude polymer, obtained according to the following Example 5, with benzonitrile, at 100°–150° C. up to 70–75%, based on the total polymer, of an insoluble crystalline fraction can be isolated. This fraction gives the X-ray diffraction spectrum, registered with a Geiger counter, reported in the figure.

In this spectrum the main reflections (CuKα radiations) are found at 2θ angles=11.3°; 14.8°; 19.4° which correspond to lattice distances of $d$=7.85 A., 5.95 A. and 4.55 A. respectively. Very similar X-ray diffraction spectra can be obtained by treating the polymer with acetophenone, dimethyl formamide or nitrobenzene. Also by a dry thermal treatment such as an annealing, it is possible to facilitate the crystallization of these polymers and to obtain X-ray diffraction spectra similar to those described above.

The poly-alpha-methylacrylonitrile mentioned under (a) are also very different from the amorphous polymers described in the literature with respect to their solubility in organic solvents.

While known amorphous polymers are easily soluble in numerous solvents such as methylene chloride, cyclohexane, acetone and benzonitrile, applicants' poly-alpha-methylacrylonitriles indicated under (a) are almost completely insoluble in all the more common organic solvents.

More particularly, the present polymers of (a) are completely insoluble even at the boiling temperature in substantially all aliphatic, cycloaliphatic aromatic, chlorinated aliphatic or chlorinated aromatic hydrocarbon and alcohol solvents. They are also insoluble in ethers such as tetrahydrofurane, dioxane, diethyl ether and diisopropyl ether and anisol, in carbon disulfide, acrylonitrile and methacrylonitrile; in esters and ketones such as acetone, methylethylketone and methyl-N-hexyl-ketone.

On the other hand, applicants' polymers are swollen by solvents such as benzonitrile, acetophenone, nitrobenzene, dimethyl formamide, succinodinitrile, pyridine and N,N-diethylaniline.

Due to the insolubility of these crystallizable polymers, it was not possible to carry out a direct determination of their molecular weight. Their thermal properties, the possibility of obtaining oriented fibers, the X-ray diffraction spectrum and the high specific viscosity of the analogous polymer samples, indicated above under (b), however, clearly demonstrate that these poly-alpha-methylacrylonitriles are high molecular weight polymeric products.

These poly-alpha-methylacrylonitriles indicated under (a) are very stable against the action of acids. In fact, after treatment for 11 hours with boiling 38% hydrochloric acid, the polymer is still crystalline under X-ray examination and its nitrogen content is only reduced from 20.3% to 19.3%.

Upon treatment with alkaline reagents such as 50% aqueous KOH, the polymers are saponified with the formation of polymethacrylic acid.

These alpha-methylacrylonitrile polymers of the present invention are distinctly different because of their high melting points from the corresponding amorphous polymers known in the literature. While these prior art amorphous polymers, depending on their method of preparation and their molecular weight, soften at temperatures of about 100–130° C. and decompose at about 200° C. with formation of the monomer, the polymers of the present invention indicated under (a), possess melting temperatures of about 200–260° C., depending on their degree of crystallinity. These polymers melt without decomposition and assume a red color.

They can therefore be molded in a suitable apparatus such as a press at temperatures of about 240–260° C., to obtain transparent laminae.

Both molded laminae and extruded filaments of poly-alpha-methylacrylonitrile, due to the high temperatures utilized in their shaping, assume a red color. However, these shaped articles can be obtained in the white form by a brief treatment with methanol containing about 5–10% of hydrochloric acid.

This red color however can be avoided or at least remarkably reduced by adding to the polymer before shaping 2–5% by weight of a compound such as alpha-bromobutyric acid.

The crystalline poly-alpha-methylacrylonitriles of (a), possessing a stereoregular structure and obtained by polymerization in the presence of organometallic compounds of magnesium and beryllium, as described above, can be worked by injection moulding, compression moulding, extrusion or any other suitable procedure to give rigid, very hard materials which are resistant to attack by most organic solvents and dilute acids and are also extremely thermally resistant.

The red color assumed by these polymers during the thermal treatments is caused by a cyclization reaction following the transfer of a charge from one nitrile group to another adjacent one.

As a result of this cyclization the trivalent bond of the nitrile group is transformed into a double bond. The double bonds thus created, form with each other a conjugated system which is the cause of the coloring. This reaction begins to become evident at temperatures above 130° C.; generally increasing until an almost complete transformation of this type occurs below the melting point of the polymeric material.

The products thus transformed possess the characteristics of an oriented semiconductor material and can therefore be employed in the semiconductors field.

A second type of poly-alpha-methylacrylonitrile, as indicated above by (b), can be obtained by the use of organometallic compounds of the formula $$MeR'_aR''_bX_c$$

wherein R', R'', X, $a$, $b$, and $c$ have the aforementioned meanings, and Me can be a metal belonging to groups Ia, II or III of the Periodic Table according to Mendeleeff, different from magnesium and beryllium. Metals particularly suitable for obtaining alpha-methylacrylonitrile polymers of type (b) are lithium, sodium, potassium, zinc, cadmium and aluminum.

The poly-alpha-methylacrylonitriles of type (b) are shown to be amorphous by X-ray examination but differ from the previously known alpha-methylacrylonitrile polymer products in that they have a much higher melting temperature and are also much less soluble in organic solvents.

While the previously known poly-alpha-methylacrylonitriles dissolve in various organic solvents such as, e.g., methylene chloride, benzonitrile, acetone, cyclohexane, toluene, methyl ethylketone and others, the polymers obtained according to the present invention and designated as type (b) are completely insoluble even in boiling solvents such as n-heptane, cyclohexane, toluene, methylene chloride, methyl ethyl ketone, dioxane, anisol and various other solvents.

When applicants' amorphous polymers are contacted with acetophenone and benzonitrile, even at their boiling points, the polymers are swollen but not dissolved.

The polymers are completely dissolved, however, by dimethylformamide. Moreover, while the previously known poly-alpha-methylacrylonitriles possess softening temperatures in general between 100° and 130° C., the amorphous polymers obtained according to the present invention have softening temperatures of about 180°–220° C.

Just as in the case of the polymers of type (a), the characteristics of the amorphous polymers of (b) can be attributed to the presence of regular steric structures in the macromolecules.

These polymers, just as the crystallizable ones of type (a), can be processed by injection molding, compression molding, extrusion or any other suitable technique, and can be employed in the field of plastics. After a suitable thermal treatment, they are also useful in the field of semi-conductors.

The amorphous and crystalline polymers of the present invention can thus be separated by extracting the crude polymerizate with suitable polar solvents for the amorphous polymer.

The manufactured articles obtained from these polymers possess desirable chemical and physical properties.

The following examples are given to better illustrate the present invention without limiting its scope.

All parts are by weight unless otherwise indicated.

*Example 1*

100 cc. of sulfur-free anhydrous toluene and 410 mg. (5 millimoles) of diethyl magnesium are placed under nitrogen in a 250-cc. three-necked flask provided with an agitator, a dropping funnel and a reflux condenser. The mixture is heated to 70° C. and while agitating, 10 g. (150 millimoles) of pure anhydrous alpha-methylacrylonitrile are introduced over a period of 30 minutes.

As soon as the addition of the monomer is begun the solution assumes a red color and after a short time considerable amounts of gelatinous masses are precipitated. In order to complete the reaction the mixture is kept for a further 6 hours at 70° C. and the content of the flask is then poured in 500 cc. of methanol containing 2–5% of hydrochloric acid. When the precipitate is completely whitened, the suspension is decanted, and the polymer is thoroughly washed with methanol and is then dried. 9.5 g. of poly-alpha-methylacrylonitrile are obtained, which corresponds to a conversion of 95%.

The polymer is in the form of a white powder having a nitrogen content, determined by the Dumas method, of 20.3% (N calculated on the basis of the formula 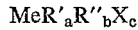$C_4H_5N_n=20.88\%$) and an ash content of 0.07%.

The polymer is a highly insoluble product. Thus, it is insoluble, even at their boiling point, in most of organic solvents, such as, e.g., in aliphatic, cycloaliphatic and aromatic hydrocarbons, chlorinated hydrocarbons, alcohols, ethers, esters, carbon disulfide, methacrylonitrile, aliphatic ketones and various other organic solvents.

By contacting the crude polymer with benzonitrile at 150° C. for 1 hour a small fraction (about 10–20%) of amorphous polymer is dissolved, thus facilitating the crystallization of the remaining swollen polymer. Analogous results are obtained by using acetophenone, nitrobenzene or dimethylformide as the swelling agent instead of benzonitrile. The insoluble crystalline fraction after being dried to remove the swelling agent, possesses an X-ray diffraction spectrum, registered with a Geiger counter, wherein the main reflections can be observed at lattice distances $d=7.85$ A., 5.95 A. and 4.55 A., as shown in the figure.

The polymer is extruded into filaments which can be hot stretched.

The polymer, upon treatment in the dry state or in swelling solvents at temperatures higher than 150° C., assumes a red color which can then be removed by brief treatment with methanol containing 5 to 10% of hydrochloric acid.

The polymer is highly resistant to organic and mineral acids but is easily saponified by 50% aqueous KOH.

It possesses a melting temperature of about 220–250° C. and can be processed at temperatures of 240–260° C. by injection molding, compression molding, extrusion, spinning or other suitable techniques.

*Example 2*

The polymerization of alpha-methylacrylonitrile is carried out as described in Example 1, but using 328 mg. (4 millimoles) instead of 5 millimoles, of diethyl magnesium and by polymerizing at 40° C. instead of 70° C.

Then by operating as described in Example 1, 4.5 g. (corresponding to a conversion of 45%) of poly-alpha-methylacrylonitrile are isolated. The polymer possesses properties similar to those of the polymer product described in Example 1.

*Example 3*

The polymerization of alpha-methylacrylonitrile is carried out as described in Example 2, but by operating at 15° C. instead of 40° C. Upon proceeding as described in Example 1, 3.4 g. (corresponding to a conversion of 34%) of poly-alpha-methylacrylonitrile are obtained. This possesses properties similar to those of the polymer product described in Example 1.

*Example 4*

The polymerization of alpha-methylacrylonitrile is carried out as described in Example 1, but using 374 mg. (2.1 millimoles) of diphenyl magnesium as the catalyst instead of diethyl magnesium and operating at 100° C. instead of 70° C. The monomer is also rapidly added, the duration of the addition being 1 minute.

Proceeding as described in Example 1, 5.7 g. (corresponding to a conversion of 57%) of poly-alpha-methylacrylonitrile are isolated. This polymer possesses properties similar to those of the polymer described in Example 1, except for the fact that the swelling solvents dissolve about 20–25% of amorphous polymer.

*Example 5*

The polymerization of alpha-methylacrylonitrile is carried out as described in Example 4, but by operating at 70° C. instead of 100° C. The monomer is added over a period of 30 minutes. Then, by proceeding as described in Example 1, 2.8 g. (corresponding to a conversion of 28%) of poly-alpha-methylacrylonitrile are isolated. The polymer possesses properties similar to those of the product described in Example 4. The X-ray diffraction spectrum (CuKα radiations), registered with the Geiger counter, of the fraction which is insoluble in benzonitrile (75% of the total), and is crystallized from this solvent, is shown in FIGURE 1.

*Example 6*

The polymerization of alpha-methylacrylonitrile is carried out as described in Example 4, but using 542 mg. (3 millimoles) of phenyl magnesium bromide as the catalyst instead of diphenyl magnesium. The monomer is added over a period of 30 minutes.

Then, by proceeding as described in Example 1, 0.7 g. (corresponding to a conversion of 7%) of poly-alpha-methylacrylonitrile is isolated. Its properties are similar to those of the sample described in Example 4.

*Example 7*

The polymerization of alpha-methylacrylonitrile is carried out as described in Example 1, but using 248 mg. (1.8 millimoles) of di-terbutyl magnesium as the catalyst.

By proceeding as described in Example 1, 1.9 g. (corresponding to a conversion of 19%) of poly-alpha-methylacrylonitrile are isolated. The polymer possesses a nitrogen content of 20.3%. Its properties are similar to those of the polymer product described in Example 4.

*Example 8*

The polymerization of alpha-methylacrylonitrile is carried out as described in Example 1, but using 335 mg. (0.52 cc., 5 millimoles) of diethyl beryllium as the catalyst in place of the diethyl magnesium. By proceeding as described in Example 1, 7.6 g. (corresponding to a conversion of 76%) of poly-alpha-methylacrylonitrile are then isolated. The product possesses properties very similar to those of the polymer described in Example 4.

This polymer is also insoluble in the solvents which failed to dissolve the polymer of Example 1. Similar to polymer of Example 1, certain swelling agents cause the swelling of the insoluble crystalline fraction. The dimethyl formamide soluble fraction, which is 30–50% of the total polymer product, depends on the particular swelling agent used. Therefore, the total degree of crystallinity of the polymer product is lower than that of the corresponding polymers obtained with the aid of organometallic magnesium compounds.

Only the fraction insoluble in the aforementioned swelling agents possesses a degree of crystallinity similar to that of the best polymers.

The melting temperature of the total polymer is of about 210–250° C. The polymer can be processed at temperatures of 230–260° C. by molding, extrusion, or the like.

*Example 9*

The polymerization of alpha-methylacrylonitrile is carried out as described in Example 8, but while operating at 25° C. instead of 70° C. By proceeding as described in Example 1, 4.6 g. (corresponding to a conversion of 46%) of poly-alpha-methylacrylonitrile having properties very similar to those of the sample described in Example 8, are then isolated.

Many variations and modifications can, of course, be practiced without departing from the scope of the present invention.

Having thus described the present invention, what it is desired to secure and claim by Letters Patent is:

1. Crystalline, head-to-tail alpha-methylacrylonitrile linear homopolymers which are insoluble in substantially all aliphatic, cycloaliphatic aromatic, chlorinated aliphatic, and chlorinated aromatic hydrocarbon solvents, alcohols, ethers, carbon disulfide, acrylonitrile, methacrylonitrile, esters and ketones, possess a sterically ordered structure, have a crystalline melting point between 200° C. and 260° C., and give an X-ray diffraction spectrum, registered with a Geiger counter, wherein the main reflections are observed at lattice distances $d=7.85$ A., 5.95 A. and 4.55 A.

2. A process for polymerizing alpha-methylacrylonitrile to crystalline, head-to-tail homopolymers which are insoluble in substantially all aliphatic, cycloaliphatic aromatic, chlorinated aliphatic and chlorinated aromatic hydrocarbon solvents, alcohols, ethers, carbon disulfide, acrylonitrile, methacrylonitrile, esters and ketones, possess a sterically ordered structure, have a crystalline melting point between 200° C. and 260° C., and give an X-ray diffraction spectrum, registered with a Geiger counter, wherein the main reflections are observed at lattice distances $d=7.85$ A., 5.95 A., and 4.55 A., wherein the monomer is polymerized at a temperature between $-30°$ C. and $+120°$ C., in contact with an organometallic catalyst consisting essentially of the compound having the general formula

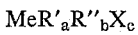
$$MeR'_aR''_bX_c$$

wherein Me is a metal selected from the group consisting of magnesium and beryllium, R' and R" each represent a member selected from the group consisting of alkyl and aryl groups, X is a bromine atom, $a$ is selected from the group consisting of zero, 1 and 2
$b$ is selected from the group consisting of 1 and 2
$c$ is selected from the group consisting of zero and 1, with the proviso that $a+b+c$ is 2,
the monomer/catalyst molar ratio being between 10:1 and 200:1.

3. A process according to claim 2, characterized in that the polymerization is carried out in an inert solvent selected from the group consisting of aliphatic, cycloaliphatic and aromatic hydrocarbons and mixtures thereof.

4. A process according to claim 2, characterized in that the organometallic compound is diethyl magnesium.

5. A process according to claim 2, characterized in that the organometallic compound is diphenyl magnesium.

6. A process according to claim 2, characterized in that the organometallic compound is phenyl magnesium bromide.

7. A process according to claim 2, characterized in that the organometallic compound is di-tertiary butyl magnesium.

8. A process according to claim 2, characterized in that the organometallic compound is diethyl beryllium.

9. A process according to claim 2, characterized in that the crystalline polymer is separated from the crude polymerizate by extracting an amorphous polymer fraction from said crude polymerizate with N,N-dimethylformamide.

References Cited by the Examiner

UNITED STATES PATENTS

| | | | |
|---|---|---|---|
| 2,608,555 | 8/1952 | Bullitt | 260—88.7 |
| 3,029,221 | 4/1962 | Welch | 260—88.7 |
| 3,081,282 | 3/1963 | Mark | 260—88.7 |
| 3,100,761 | 8/1963 | Fellman et al. | 260—85.5 |

OTHER REFERENCES

Beaman: J. Am. Chem. Soc., vol. 70 (1948), pp. 3115–8.

Gaylord et al.: Linear and Stereoregular Addition Polymers, Interscience Publ., Inc., N.Y. (1959), pp. 88, 100, 466, 515, 516.

JOSEPH L. SCHOFER, *Primary Examiner.*

LOUIS P. QUAST, DONALD E. CZAJA, *Examiners.*